US012018693B2

(12) United States Patent
Sishtla et al.

(10) Patent No.: US 12,018,693 B2
(45) Date of Patent: Jun. 25, 2024

(54) METHOD AND SYSTEM FOR COMPRESSOR OPERATING RANGE EXTENSION VIA ACTIVE VALVE CONTROL

(71) Applicant: Carrier Corporation, Palm Beach Gardens, FL (US)

(72) Inventors: Vishnu M. Sishtla, Palm Beach Gardens, FL (US); William T. Cousins, Palm Beach Gardens, FL (US)

(73) Assignee: Carrier Corporation, Palm Beach Gardens, FL (US)

( * ) Notice: Subject to any disclaimer, the term of this patent is extended or adjusted under 35 U.S.C. 154(b) by 573 days.

(21) Appl. No.: 17/254,500

(22) PCT Filed: May 11, 2020

(86) PCT No.: PCT/US2020/032359
§ 371 (c)(1),
(2) Date: Dec. 21, 2020

(87) PCT Pub. No.: WO2020/231933
PCT Pub. Date: Nov. 19, 2020

(65) Prior Publication Data

US 2021/0270279 A1 Sep. 2, 2021

Related U.S. Application Data

(60) Provisional application No. 62/847,363, filed on May 14, 2019.

(51) Int. Cl.
*F25B 49/02* (2006.01)
*F04D 17/10* (2006.01)
(Continued)

(52) U.S. Cl.
CPC ......... *F04D 27/0253* (2013.01); *F04D 17/10* (2013.01); *F25B 1/053* (2013.01);
(Continued)

(58) Field of Classification Search
CPC ........ F25B 1/053; F25B 49/02; F25B 49/022; F25B 49/027; F25B 2600/02;
(Continued)

(56) References Cited

U.S. PATENT DOCUMENTS 2,715,992 A 8/1955 Wilson
2,963,878 A 12/1960 Beggs et al.
(Continued)

FOREIGN PATENT DOCUMENTS

CN 101375490 A 2/2009
CN 101832689 A 9/2010
(Continued)

OTHER PUBLICATIONS

International Preliminary Report on Patentability for International Patent Application No. PCT/US2020/032359 completed on Nov. 16, 2021.
(Continued)

*Primary Examiner* — Nael N Babaa
(74) *Attorney, Agent, or Firm* — Carlson, Gaskey & Olds, P.C.

(57) ABSTRACT

An exemplary compressor system includes a compressor having a fluid inlet and a fluid outlet. An isolation valve connects the fluid outlet of the compressor to a condenser. A controller is communicatively coupled to the isolation valve and the compressor. The controller includes a memory storing instructions configured to cause the controller to detect one of a surge event and a surge event precursor and restrict an opening in the isolation valve in response.

18 Claims, 3 Drawing Sheets

(51) Int. Cl.
*F04D 27/02* (2006.01)
*F25B 1/053* (2006.01)

(52) U.S. Cl.
CPC ............ *F25B 49/02* (2013.01); *F25B 49/022* (2013.01); *F25B 49/027* (2013.01); *F05D 2220/30* (2013.01); *F05D 2270/101* (2013.01); *F25B 2600/02* (2013.01); *F25B 2600/0271* (2013.01); *F25B 2600/25* (2013.01)

(58) Field of Classification Search
CPC .......... F25B 2600/027; F25B 2600/025; F25B 2600/271
See application file for complete search history.

(56) References Cited

U.S. PATENT DOCUMENTS

| | | | |
|---|---|---|---|
| 3,411,702 | A | 11/1968 | Metot et al. |
| 3,424,370 | A | 1/1969 | Law |
| 3,555,844 | A | 1/1971 | Fleckenstein et al. |
| 4,248,055 | A | 2/1981 | Day, III et al. |
| 4,522,037 | A | 6/1985 | Ares et al. |
| 4,749,166 | A | 6/1988 | Huenniger |
| 5,203,179 | A | 4/1993 | Powell |
| 5,306,116 | A | 4/1994 | Gunn et al. |
| 6,202,431 | B1 | 3/2001 | Beaverson et al. |
| 6,931,867 | B2 | 8/2005 | Healy et al. |
| 7,356,999 | B2 | 4/2008 | Bodell, II et al. |
| 8,840,358 | B2 | 9/2014 | Huis In Het Veld |
| 9,217,592 | B2 | 12/2015 | Turney et al. |
| 10,202,980 | B2 | 2/2019 | Koki et al. |
| 2006/0242985 | A1 | 11/2006 | Leck et al. |
| 2015/0219110 | A1 | 8/2015 | De |
| 2018/0223856 | A1 | 8/2018 | Gallinelli et al. |
| 2019/0085854 | A1 | 3/2019 | Gallinelli et al. |

FOREIGN PATENT DOCUMENTS

| | | | |
|---|---|---|---|
| CN | 102007301 | A | 4/2011 |
| CN | 103628970 | A | 3/2014 |
| CN | 104533767 | | 4/2015 |
| CN | 104567158 | | 4/2015 |
| CN | 108131319 | A | 6/2018 |
| JP | 04303199 | | 10/1992 |
| JP | 2005528980 | | 9/2005 |

OTHER PUBLICATIONS

International Search Report and Written Opinion for International Application No. PCT/US2020/032359 dated Jul. 24, 2020.

Principle and Technology of Refrigeration Appliances, May 31, 1996.

METHOD AND SYSTEM FOR COMPRESSOR OPERATING RANGE EXTENSION VIA ACTIVE VALVE CONTROL

TECHNICAL FIELD

The present disclosure relates generally to compressor systems, and more specifically to a method and system for extending an operating range of a compressor system using an actively controlled valve.

CROSS-REFERENCE TO RELATED APPLICATION

This application claims priority to U.S. Provisional Application No. 62/847,363 filed May 14, 2019.

BACKGROUND

Compressor systems, such as those utilized in air conditioning and refrigeration systems utilize a compressor to compress a coolant. The compressed coolant is provided to a condenser that condenses the coolant and provides the coolant to a cooled system and an evaporator. As the coolant passes through the cooled system and the evaporator, the coolant expands and gains heat. Once passed through the cooled system and the evaporator, the spent coolant is provided back to the inlet of the compressor.

Operations of the compressor are generally limited by a compressor load and temperature which dictate a choke parameter and a surge parameter of the compressor. The range of operations between choke and surge is referred to as the operating range of the compressor and defines efficient operation of the compressor system.

SUMMARY OF THE INVENTION

An exemplary method for extending an operating range of a compressor system includes detecting one of a surge event and a surge event precursor, and restricting flow into a condenser in response.

In another example of the above described exemplary method for extending an operating range of a compressor restricting flow into the condenser comprising restricting an actively controlled valve until the one of the surge event and the surge event precursor ceases.

Another example of any of the above described exemplary methods for extending an operating range of a compressor further includes maintaining a restricted state of the actively controlled valve for at least a predefined duration.

Another example of any of the above described exemplary methods for extending an operating range of a compressor further includes monitoring a compressor output and decreasing a restriction on the actively controlled valve in response to detecting a lack of the surge event and the surge event precursor.

Another example of any of the above described exemplary methods for extending an operating range of a compressor further includes adjusting a state of the actively controlled valve according to a feedback loop such that the restricted state of the actively controlled valve maintains a compressor operating point immediately below a surge line.

In another example of any of the above described exemplary methods for extending an operating range of a compressor the actively controlled valve connects an output of a compressor to an input of the condenser.

In another example of any of the above described exemplary methods for extending an operating range of a compressor the compressor is a centrifugal compressor.

In one exemplary embodiment a compressor system includes a compressor including a fluid inlet and a fluid outlet, an isolation valve connecting the fluid outlet of the compressor to a condenser, and a controller communicatively coupled to the isolation valve and the compressor, the controller including a memory storing instructions configured to cause the controller to detect one of a surge event and a surge event precursor and restrict an opening in the isolation valve in response.

In another example of the above described compressor system the compressor is a centrifugal compressor.

Another example of any of the above described compressor systems further includes a throttle valve connecting an output of the condenser to a cooled system.

In another example of any of the above described compressor systems an output of the cooled system is connected to the fluid inlet of the compressor via an evaporator.

In another example of any of the above described compressor systems restricting flow into the condenser comprising restricting the isolation valve until the one of the surge event and the surge event precursor ceases.

In another example of any of the above described compressor systems the isolation valve is an actively controlled valve.

In another example of any of the above described compressor systems the memory further stores instructions configured to cause the controller to maintain a restricted state of the isolation valve for at least a predefined duration.

In another example of any of the above described compressor systems the memory further stores instructions configured to cause the controller to monitor a compressor output and decrease a restriction on the isolation valve in response to detecting a lack of the surge event and the surge event precursor.

In another example of any of the above described compressor systems the memory further stores instructions configured to cause the controller to adjusting a state of the actively controlled valve according to a feedback loop such that the restricted state of the actively controlled valve maintains a compressor operating point immediately below a surge line.

These and other features of the present invention can be best understood from the following specification and drawings, the following of which is a brief description.

DETAILED DESCRIPTION

Figure 1:
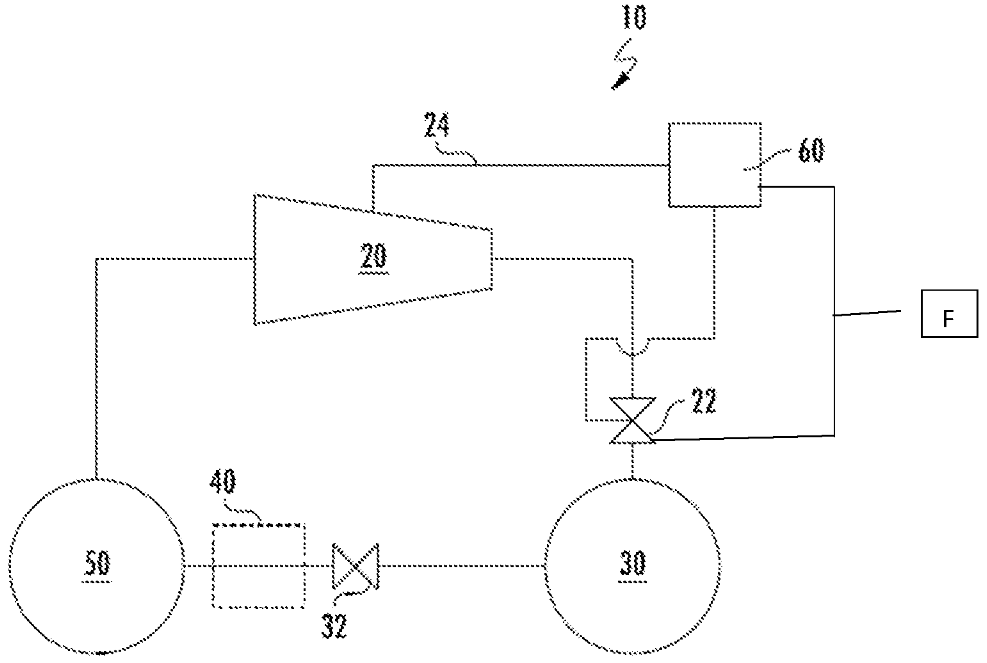
FIG. 1 illustrates a highly schematic compressor system.

FIG. 1 illustrates a highly schematic compressor system 10 including a compressor 20. The compressor 20 is fluidly connected to a condenser 30 via an actively controlled valve 22. As used herein, an actively controlled valve refers to a valve whose state is controlled via a controller and that is able to be dynamically held in multiple states between fully open and fully closed. The condenser 30 is fluidly connected to a cooled system 40 via a throttle valve 32. The output of the cooled system 40 is provided to an evaporator 50 which further converts the spent coolant from the cooled system 40. The vaporized coolant is provided back to the compressor 20, which re-compresses the fluid allowing for the cycle to continue.

A controller 60 is connected to the actively controlled valve 22 and controls an open/closed state of the actively controlled valve 22. The controller 60 can be any known controller type configured to control the state of the actively controlled valve 22. The controller 60 further includes a communication line 24 connected to the compressor 20. The communication line 24 allows for the controller 60 to communicate with sensors within the compressor 20. In some examples, the communication line 24 further allows the controller 60 to control operations of the compressor 20. While illustrated herein as a single communication line 24, it is appreciated that the communication line 24 can be any number of electrical communication connections in practical implementations.

In some examples, the controller 60 is a dedicated compressor system controller. In alternative examples, the controller 60 is a general controller configured to control multiple additional systems beyond the actively controlled valve 22 and the compressor 20.

Figure 2:
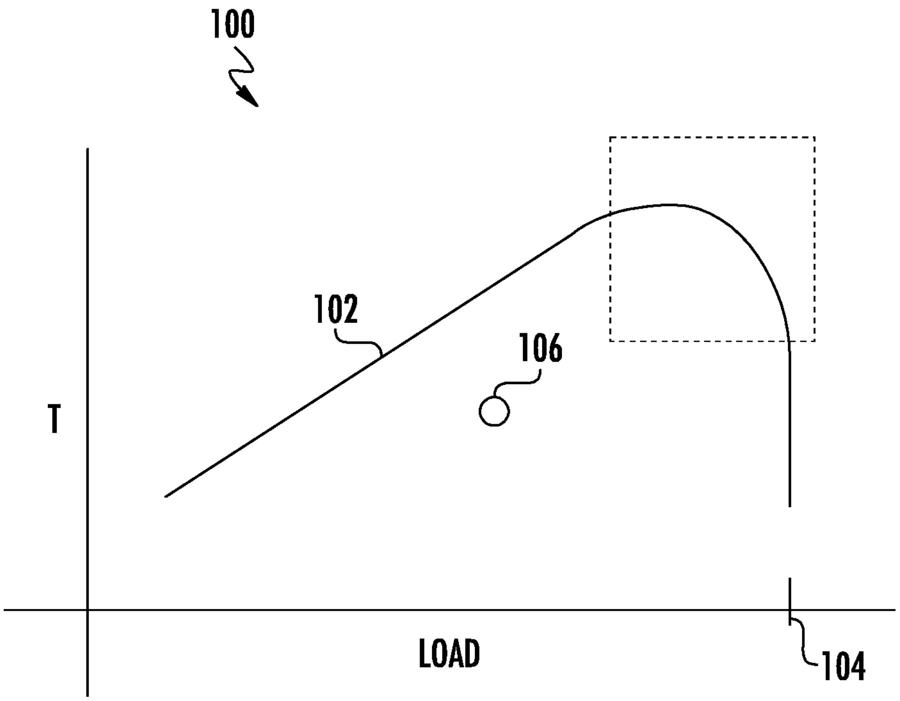
FIG. 2 is a chart illustrating an operating range of the highly schematic compressor system of claim 1.

The compressor 20 is a centrifugal compressor and includes an operating range defining efficient operations of the compressor system 10. An exemplary operating range chart 100 is illustrated in FIG. 2, and includes a surge line 102 defining an operating condition (temperature vs. load) above which surge will occur within the compressor. This operating condition is a region above the surge line 102. The chart 100 also illustrates a stonewall point 104 at which choking will occur within the compressor 20. Choking occurs when the compressor is operating at a low discharge pressure and very high flow rates and results in the system reaching a maximum flow rate.

When the temperature and load of the system 10 exceed the surge line 102 a surge begins occurring which can result in instability in the system 10. The instability can result in vibrations, audible noise, and potentially damage to components. Surge detection systems are conventional in the art and can be utilized to detect when a surge event begins occurring. In alternative examples, surge detection systems are employed that can detect conditions leading up to a surge and the precursors can be responded to, thereby avoiding the beginning of a surge condition entirely.

The operating point of the system refers to the current temperature and load of the compressor output, and is represented as a point 106 on the chart 102 with the vertical axis (T) being the temperature and the horizontal axis (load) being the load seen by the compressor 20. When the temperature increases, or the load decreases, the operating point 106 is shifted relative to the surge line 102. If the operating point 106 shifts above the surge line 102, a surge occurs and negatively impacts functions of the compressors system 10. The area under the surge line 102 and to the left of the stonewall point 104 is referred to as the operating range of the compressor system 10.

In the example system 10 (illustrated in FIG. 1), the load seen by the compressor 20 is at least partially determined by the volume of the condenser 30 and the flow rate into the condenser 30. Restricting the actively controlled valve 22 increases the load seen by the compressor without altering the volume of the condenser by restricting the flow rate into the condenser 30. This is referred to as artificially increasing the load.

Figure 3:
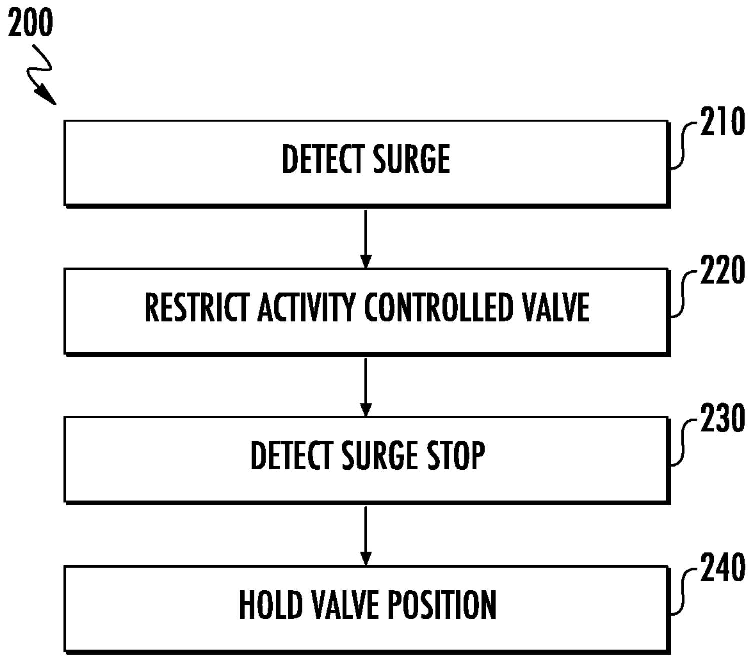
FIG. 3 schematically illustrates a process for increasing the operating range of the schematic compressor system of FIG. 1.

With continued reference to FIGS. 1 and 2, FIG. 3 schematically illustrates a process 200 for responding to a detected surge event by modulating the actively controlled valve 22. Initially, the controller 60 detects the beginning of a surge condition via any known surge detection scheme in a "Detect Surge" step 210. Alternatively, the controller 60 can detect the precursors to a surge event and respond to the precursors instead of the event itself.

Once detected, the controller 60 causes the actively controlled valve 22 to begin restricting in a "Restrict Actively Controlled Valve" step 220. By restricting the actively controlled valve 22, the load seen by the compressor is artificially increased which shifts the operating point of the compressor system 10 to the right on the operating range chart 100. This shifting raises the surge line, thereby moving the operation point back below the surge line 102, preventing or stopping surge from occurring. During the process of restricting the actively controlled valve 22, the controller 60 monitors the compressor parameters via communication line 24 and can detect when the surge condition or surge precursors stop occurring.

Once the surge conditions, or surge precursors, have stopped occurring, the controller 60 causes the actively controlled valve to be maintained in the current state in a "Hold Valve Position" step 240. In some examples, the controller 60 can periodically, or gradually re-open the actively controlled valve 22 as the time proceeds away from detected surge condition. In the alternative example, the controller 60 ceases re-opening the actively controlled valve when surge conditions or precursors are detected.

With further reference to the process described above and illustrated in FIG. 3, another alternative example can include continuous monitoring and adjusting of the actively controlled valve 22. In this example, a feedback control loop F (FIG. 1) is utilized to keep the operating point 106 as close to the surge line as possible, while not allowing the operating point 106 to cross above the surge line 102. Maintaining the operation point 106 as close to the surge line as possible without going over the surge line 102 provides for an increased ability to unitize the good operating range of the compressor system 10.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for extending an operating range of a compressor system comprising:

detecting one of a surge event and a surge event precursor, and restricting flow exiting a compressor prior to entering into a condenser in response; and wherein in response to detection of one of the surge event and the surge event precursor, the method includes restricting flow exiting the compressor to increase a load seen by the compressor without altering a volume of the condenser by restricting a flow rate into the condenser, and/or an operating point of the compressor system refers to a current temperature and load of a compressor output, and including adjusting a state of an actively controlled valve according to a feedback loop to maintain the operating point immediately below a surge line, while not allowing the operating point to cross above the surge line.

2. The method of claim 1, wherein restricting flow into the condenser comprises restricting the actively controlled valve until the one of the surge event and the surge event precursor ceases.

3. The method of claim 2, further comprising maintaining a restricted state of the actively controlled valve for at least a predefined duration.

4. The method of claim 2, further comprising monitoring the compressor output and decreasing a restriction on the actively controlled valve in response to detecting a lack of the surge event and the surge event precursor.

5. The method of claim 4, further comprising adjusting a state of the actively controlled valve according to the feedback loop such that a restricted state of the actively controlled valve maintains the operating point immediately below the surge line.

6. The method of claim 2, wherein the actively controlled valve connects the compressor output to an input of the condenser.

7. The method of claim 6, wherein the compressor is a centrifugal compressor.

8. A compressor system comprising:

a compressor including a fluid inlet and a fluid outlet;

an isolation valve connecting the fluid outlet of the compressor to a condenser;

a controller communicatively coupled to the isolation valve and the compressor, the controller including a memory storing instructions configured to cause the controller to detect one of a surge event and a surge event precursor and restrict an opening in the isolation valve in response; and wherein an operating point of the compressor system refers to a current temperature and load of a compressor output, and wherein the controller includes a feedback control loop that is utilized to maintain the operating point immediately below a surge line, while not allowing the operating point to cross above the surge line.

9. The compressor system of claim 8, wherein the compressor is a centrifugal compressor.

10. The compressor system of claim 8, further comprising a throttle valve connecting an output of the condenser to a cooled system.

11. The compressor system of claim 10, wherein an output of the cooled system is connected to the fluid inlet of the compressor via an evaporator.

12. The compressor system of claim 8, wherein restricting flow into the condenser comprises restricting the isolation valve until the one of the surge event and the surge event precursor ceases.

13. The compressor system of claim 12, wherein the isolation valve is an actively controlled valve.

14. The compressor system of claim 8, wherein the memory further stores instructions configured to cause the controller to maintain a restricted state of the isolation valve for at least a predefined duration.

15. The compressor system of claim 14, wherein the memory further stores instructions configured to cause the controller to monitor the compressor output and decrease a restriction on the isolation valve in response to detecting a lack of the surge event and the surge event precursor.

16. The compressor system of claim 15, wherein the memory further stores instructions configured to cause the controller to adjust a state of the isolation valve according to the feedback control loop such that the restricted state of the isolation valve maintains the operating point immediately below the surge line.

17. The compressor system of claim 8, wherein flow exiting the compressor is restricted prior to entering into the condenser when one of the surge event and the surge event precursor is detected.

18. A compressor system comprising:

a compressor including a fluid inlet and a fluid outlet:

an isolation valve connecting the fluid outlet of the compressor to a condenser; and a controller communicatively coupled to the isolation valve and the compressor, the controller including a memory storing instructions configured to cause the controller to detect one of a surge event and a surge event precursor and restrict an opening in the isolation valve in response, wherein flow exiting the compressor is restricted prior to entering into the condenser when one of the surge event and the surge event precursor is detected, and wherein restricting the flow exiting the compressor increases a load seen by the compressor without altering a volume of the condenser.

* * * * *